(12) United States Patent
Korhammer et al.

(10) Patent No.: US 6,278,982 B1
(45) Date of Patent: Aug. 21, 2001

(54) SECURITIES TRADING SYSTEM FOR CONSOLIDATION OF TRADING ON MULTIPLE ECNS AND ELECTRONIC EXCHANGES

(75) Inventors: Richard A. Korhammer, New York, NY (US); Kamran L. Rafieyan, Basking Ridge, NJ (US); Keith P. Chutjian, New York, NY (US)

(73) Assignee: Lava Trading Inc., New York, NY (US)

( * ) Notice: Subject to any disclaimer, the term of this patent is extended or adjusted under 35 U.S.C. 154(b) by 0 days.

(21) Appl. No.: 09/296,096

(22) Filed: Apr. 21, 1999

(51) Int. Cl.[7] .................................................. G06F 17/60
(52) U.S. Cl. ............................................. 705/37; 705/36
(58) Field of Search .................................. 705/35, 36, 37

(56) References Cited

U.S. PATENT DOCUMENTS

| | | | |
|---|---|---|---|
| 4,334,270 | 6/1982 | Towers | 364/300 |
| 4,412,287 | 10/1983 | Braddock, III | 364/300 |
| 4,674,044 | 6/1987 | Kalmus et al. | 364/408 |
| 4,677,552 | 6/1987 | Sibley, Jr. | 364/408 |
| 5,038,284 | 8/1991 | Kramer | 364/408 |
| 5,101,353 | 3/1992 | Lupien et al. | 364/408 |
| 5,126,936 | 6/1992 | Champion et al. | 364/408 |
| 5,132,899 | 7/1992 | Fox | 364/408 |
| 5,136,501 | * 8/1992 | Silverman et al. | 705/37 |
| 5,220,500 | 6/1993 | Baird et al. | 364/408 |
| 5,267,148 | 11/1993 | Kosaka et al. | 364/408 |
| 5,270,922 | 12/1993 | Higgins | 364/408 |
| 5,297,032 | 3/1994 | Trojan et al. | 364/408 |
| 5,497,317 | 3/1996 | Hawkins et al. | 364/408 |
| 5,689,652 | 11/1997 | Lupien et al. | 395/237 |
| 5,710,889 | 1/1998 | Clark et al. | 395/244 |
| 5,845,266 | 12/1998 | Lupien et al. | 705/37 |
| 5,864,827 | 1/1999 | Wilson | 705/35 |
| 5,924,083 | * 7/1999 | Silverman et al. | 705/37 |
| 5,950,177 | * 9/1999 | Lupien et al. | 705/37 |
| 6,012,046 | * 1/2000 | Lupien et al. | 705/37 |

FOREIGN PATENT DOCUMENTS

0407026A2 * 1/1991 (GP) .

OTHER PUBLICATIONS

Jul., 1998*
Eisenhammer "Stock Exchange gives go–ahead to trading reforms"; Financial Editor; Dialog File 711, Accession No. 08582140. Mar. 1996*
"Future Stock Exchange Need Intergrating" Newsbytes; Dialog file: 16, Accession No. 05015967, May, 1997.*
A revolution in securities markets'structures? Financial Market trends, n65, p15(19); Dialog file 148, Accession No. 09218803, Nov. 1996.*

* cited by examiner

Primary Examiner—Tariq R. Hafiz
Assistant Examiner—Romain Jeanty
(74) Attorney, Agent, or Firm—Bazerman & Drangel, PC

(57) ABSTRACT

A securities trading consolidation system where each customer uses a single trader terminal to view, and analyze security market information from and to conduct security transactions with two or more ECNs, or other comparable ATSs, alone or in combination with one or more electronic exchanges. A consolidating computer system supplies the market information and processes the transactions. The consolidating computer system aggregates order book information from each participating ECN order book computer including security, order identification, and bid/ask prices information. Bid and ask prices for participating electronic exchanges may be integrated into the display. The combined information is displayed to a customer by security and by bids and offers, and then sorted by price, volume and other available attributes as desired by the customer. The consolidating computer system forwards to each trading terminal information from only those market maker ECNs and electronic exchanges that the customer is an ECN member or electronic exchange user and thus entitled to receive.

19 Claims, 7 Drawing Sheets

FIG. 4

Market Data - DELL
DELL 39 3/8
High: 39 3/8  Low: 39 1/8  ↓ -1/16  Vol: 743,300  500

| | | | | | |
|---|---|---|---|---|---|
| 10 | GSCO | 39 1/4 | 33 | INCA | 39 5/16 |
| 10 | SBSH | 39 1/4 | 10 | SLKC | 39 5/16 |
| 27 | ISLD | 39 7/32 | 39 | ISLD | 39 5/16 |
| 10 | MLCO | 39 3/16 | 1 | PRUS | 39 5/16 |
| 2 | MADF | 39 3/16 | 46 | STRK | 39 5/16 |
| 10 | BEST | 39 3/16 | 10 | OPCO | 39 3/8 |
| 17 | INCA | 39 3/16 | 9 | PERT | 39 3/8 |
| 1 | DEAN | 39 1/8 | 50 | REDI | 39 3/8 |
| 17 | STRK | 39 1/8 | 10 | NFSC | 39 3/8 |
| 9 | DLJP | 39 1/16 | 7 | OLDE | 39 3/8 |
| 10 | BTAB | 39 | 6 | NITE | 39 3/8 |
| 1 | JEFF | 39 | 3 | HRZG | 39 7/16 |
| 10 | MHIL | 39 | 10 | WARR | 39 7/16 |
| 1 | JPMS | 39 | 10 | MADF | 39 7/16 |
| 10 | HRZG | 39 | *10 | SHWD | 39 7/16 |
| 1 | SLKC | 39 | 10 | COST | 39 1/2 |
| 1 | CANT | 39 | 2 | DEAN | 39 1/2 |
| 1 | FBCO | 39 | 1 | MONT | 39 1/2 |
| 10 | MWSE | 39 | 15 | MLCO | 39 1/2 |
| 10 | OLDE | 39 | 1 | COWN | 39 1/2 |
| 10 | MSCO | 39 | 1 | FBCO | 39 1/2 |
| 10 | PWJC | 39 | 1 | SELZ | 39 1/2 |

FIG. 5

Market Data - DELL
DELL 39 3/8
High: 39 3/8  Low: 39 1/8  ↓ -1/16  Vol: 743,300  500

| | | | | | |
|---|---|---|---|---|---|
| 10 | GSCO | 39 1/4 | 33 | INCA | 39 5/16 |
| 10 | SBSH | 39 1/4 | 10 | SLKC | 39 5/16 |
| 27 | ISLD | 39 7/32 | 39 | ISLD | 39 5/16 |
| 10 | MLCO | 39 3/16 | 1 | PRUS | 39 5/16 |
| 2 | MADF | 39 3/16 | 46 | STRK | 39 5/16 |
| 10 | BEST | 39 3/16 | 6 | ISLD | 39 11/32 |
| 17 | INCA | 39 3/16 | 10 | OPCO | 39 3/8 |
| 15 | ISLD | 39 3/16 | 9 | PERT | 39 3/8 |
| 45 | ISLD | 39 5/32 | 50 | REDI | 39 3/8 |
| *2 | INCA | 39 5/32 | 10 | NFSC | 39 3/8 |
| 1 | DEAN | 39 1/8 | 7 | OLDE | 39 3/8 |
| 17 | INCA | 39 1/8 | 38 | ISLD | 39 3/8 |
| 17 | STRK | 39 1/8 | 34 | INCA | 39 3/8 |
| 12 | ISLD | 39 1/8 | 42 | STRK | 39 3/8 |
| 4 | ISLD | 39 3/32 | 6 | NITE | 39 3/8 |
| 7 | INCA | 39 3/32 | 3 | HRZG | 39 7/16 |
| 53 | INCA | 39 1/16 | 10 | WARR | 39 7/16 |
| 9 | DLJP | 39 1/16 | 10 | MADF | 39 7/16 |
| 13 | ISLD | 39 1/16 | 52 | INCA | 39 7/16 |
| 27 | STRK | 39 1/16 | 41 | STRK | 39 7/16 |
| 10 | BTAB | 39 | 19 | ISLD | 39 7/16 |
| 1 | JEFF | 39 | 10 | SHWD | 39 7/16 | though they purchase shares and
SECURITIES TRADING SYSTEM FOR CONSOLIDATION OF TRADING ON MULTIPLE ECNS AND ELECTRONIC EXCHANGES

FIELD OF THE INVENTION

The present invention generally relates to computer systems for trading and analyzing selected securities, and more particularly, software that aggregates and integrates securities trading information and order placement from various alternative trading systems ("ATS"), such as electronic communication networks ("ECN"), with NASDAQ or other electronic exchanges.

BACKGROUND OF THE INVENTION

There are currently three primary types of computer accessible trading systems for securities such as stocks, bonds, commodities and derivatives. The first is the conventional stock exchange system exemplified by the New York Stock Exchange and New York Mercantile Exchange. On such exchanges the market is made for each security by a single registered stock dealer, such as a registered stock specialist, who has a seat on the exchange. In addition to face-to-face and telephone communication to the dealers/specialists on the floor, computers are used to send orders to the dealers/specialists on the exchange floor. Information as to the buy and sell prices (bid/offer prices, respectively) are supplied by the dealer/specialist to the exchange and brokers through the dealer/specialist's trading computer terminal. Electronic orders are matched by the dealer/specialist maintaining an orderly market. Upon matching an order the dealer/specialist confirms the execution with the trading terminal and a central computer which stores transaction data.

The second system is electronic exchanges which utilize electronic access of dealer posted market prices without a negotiating specialist or floor based exchange. The largest of these is NASDAQ. It is a totally computer-based market where each member dealer can make its own market in the stocks traded on the exchange through a computer network. Dealers trading a significant number of shares in a stock in their own name and profiting from the spread (i.e., the difference between the price which they purchase shares and the price for which they sell them) are called market makers. Market makers are most often, but not always, large financial institutions. There are usually a number of market makers in a stock, each bidding and offering stock for themselves or their customer.

The best bid to buy by any market maker and the best offer to sell by any market maker for a security is called the security's "inside market." NASDAQ supplies trading data to the participants via a computer network at three different service levels, known as Level I, Level II and Level III. Level I, inter alia, allows real-time access to the following data: (1) Inside market quotes (highest bid and lowest offer) for listed securities, (2) individual market maker quotations, as well as inside quotes for OTC Bulletin Board listed securities, (3) trade price and volume data. Level II additionally provides, among other things, real-time price quotations for each Market Maker and the inside price for each ATS in its computer network. Level III is a service limited to member dealers, allowing them to provide NASDAQ with their best bid and offer for securities in which they make markets, and receive incoming orders. There are various systems for displaying Level II and III data, such as disclosed in U.S. Pat. No. 5,297,032 to Trojan et al., issued Mar. 22, 1994.

Electronic exchanges may place, match, record and confirm transactions through their computer network. If a market order is placed through, for example NASDAQ without any restrictions, the NASDAQ computers make the actual match between an offer price and the bid price and thus will select the parties for the transaction. However a broker may indicate a preference to buy from or sell to a particular market maker.

Historically, market makers have solely determined the prices for securities on electronic exchanges such as NASDAQ. Non-members must place their orders and their customers' orders with a member dealer who receives a placement fee. Similar to other securities exchanges, electronic exchanges, such as NASDAQ, receive a fee for each such transaction.

The third trading system is alternative trading systems ("ATS") which provide ATS members and electronic exchange users, such as NASDAQ users, an electronic network by which they may display and execute their orders independent of a market maker or specialist. By doing so, members avoid conventional fees while enjoying more current and complete market information. ATSs are presently regulated under SEC Rule 17(a)(3) and 17(a)(4) as they apply to broker/dealer internal trading systems. Currently the most popular ATSs are ECNs. There are currently eight ECNs, including Instinet, Strike, and Island, with others under development and expected shortly. Given the recent surge in public electronic investment trading, demand for ATS access and the resulting traffic has increased sharply.

Each member of an ECN has a trading terminal that is connected with the ECN's central order book computer. Members display their bids and offers and conduct transactions through the resulting network. The ECN's order book computer keeps track of bid/offer information including price, volume, and execution for each open and closed transaction as supplied to it in real time by its members. The order book computer also records which computer, and thus, which member posted each bid or offer. Once a bid is hit or an offer is taken through the central order book computer, the central order book and members' trading terminals are so updated and the accepted bids and offers are no longer displayed.

ECNs were originally developed for their members to trade amongst themselves. Thus, each ECN developed its own terminals and protocols. The ECN receives a fee, normally based on transaction volume, for each transaction.

In a conventional stock exchange or an electronic exchange, buyers and sellers are subjected to intermediaries in the transaction, i.e., respectively the specialist or the market maker dealing in a particular security. However, in an ECN, each bid and offer is a discrete and anonymous order, fully viewable by and accessible to all its members. Accordingly a broker/dealer member or for that matter, simply a member, may have a number of bids and offers at different prices, posted on an ECN's central order book. There are no specialist or dealer intermediaries for these orders, thus removing third party delays and fees typically associated with traditional exchanges and electronic exchanges. The member controls through its trading computer all aspects of trading securities including order entry, price, volume, duration and cancellation. The member may, at its discretion, select desirable transactions from all open orders available as displayed from the ECN's central order book. The member may choose from the inside market for the security or at a worse price outside of the inside market. Such freedom is highly desirable. For example, it may be a wise strategy to buy securities at a price equal to or higher than the best offer in order to obtain more shares than the inside offer is displaying. This strategy also recognizes that the inside market is moving quickly and may not be available when trying to take the best offer.

Given the closed nature of individual ECNs, there are substantial fluctuations between the prices being offered within each ECN and between ECNs. In an attempt to solve the problem, SEC's Limit Order Rule requires each conforming ECN to display its inside market on electronic exchanges such as NASDAQ. The inside market data is displayed and accessed by users of the electronic exchange network. Such an ECN is a conforming ECN integrated with the exchange. An ECN will not receive NASDAQ quotes, but ECN members may receive this data if they are broker dealers.

Integrating ECNs and their inside market data with electronic exchanges only solves part of the existing market's fragmentation. A non-member of an integrated ECN only has access to the ECN's inside prices and may only execute upon them. Without membership in an ECN, i.e., a direct connection to the ECN, a user of an electronic exchange must use the electronic exchange as an intermediary to observe fluctuation in the ECN's inside market. Having to use an intermediary to an ECN will result in data transmission delays compared to members of the ECN who have direct access to the ECN's network. Finally when a trade is made by an ECN member through NASDAQ or a similar electronic exchange or by an electronic exchange user through the ECN, he/she usually pays two fees, one to the ECN and one to the electronic exchange.

SUMMARY OF THE PRESENT INVENTION

It is an object of the present invention to provide a system for integrating, organizing and displaying securities market information from several ECNs and electronic exchanges in real time.

It is another object of the present invention to provide a means to translate the computer protocol of each ECN and electronic exchanges to a common protocol.

It is also an object of the present invention to provide on screen a real time display of the individual bids and offers from each member of the participating ECNs and market makers of the electronic exchanges organized by security and by offer or by bid. The order information is then sorted first by price, and then by time of placement, volume, or other attributes.

It is further an object of the present invention to allow the aggregated bid and offer information to be filtered through specification of configuration parameters such as minimum order size and minimum price granularity.

It is another object of the present invention to provide a system by which this aggregated data can be transmitted to the customer either through direct lines, the Internet or via any other form of network for display and execution.

It is also an object of the present invention to provide a trading system where a single application on a single computer terminal can place orders to any of the participating ECNs and electronic exchanges.

It is an additional object of the present invention to allow a customer of the present system to take advantage of all the special order-entry features of each ECN and the electronic exchanges, such as the ability to place hidden limit orders, or specify minimum execution quantities.

It is further an object of the invention to analyze the data from the various ECNs and the electronic exchanges to calculate real-time metrics and determine the occurrence of certain types of market events.

It is yet again an object of this invention to limit the information supplied from the ECNs to a customer of the present invention to only those ECNs and electronic exchanges where the customer is an ECN member or electronic exchange user.

It is still another object of the invention to use the above-mentioned analytical capabilities to aid a customer of the present invention to make various market decisions, such as when and where to place orders.

These and other objects are achieved in the present invention consisting of a securities trading consolidation system. In this system, each customer uses a single application on a single trader terminal to view, and analyze security market information from and to conduct security transactions with two or more ECNs, or other comparable ATSs, alone or in combination with one or more electronic exchanges. A consolidating computer system ("CCS") supplies the market information and processes the transactions in the present system.

The trading terminals, each participating ECN order book computer, each participating electronic exchange, and the CCS form a computer network. The ECNs' order book computers, the electronic exchanges' servers and the CCS may, in actuality, each be complex systems consisting of a number of computers and networks. The CCS aggregates order book information from each participating ECN order book computer including security, order identification, and bid/offer price information. Bid and ask prices for participating electronic exchanges may be integrated into the display. The combined information is displayed to customers for the selected security separately for bids and offers, and sorted by price, volume and other available attributes as desired by the customer.

The CCS forwards to each trading terminal information from only those ECNs and electronic exchanges, that the customer is an ECN member or electronic exchange user and thus entitled to receive. The rights to the information may be based on the customer's arrangement or membership in an ECN or with an electronic exchange. Thus a customer may only be able to receive information from a subset of ECN's and electronic exchanges to which the CCS is connected.

Once the information from a number of ECNs and electronic exchanges are combined in the CCS, either the CCS, the trading terminal, or both can be used to calculate real time metrics. The real time metrics, such as volume trends, price trends, and various on demand calculations, can aid the trader in making decisions. The CCS can also determine the occurrence of market events in which its customers may be interested, such as a new high bid for the day or a locked market where the best bid is equal to the best offer.

The trading terminal both displays the market information provided to it by the CCS and allows the customer to place bid and/or offer orders and route them through the CCS to any ECN or electronic exchange for which the customer is permissioned. These orders will be incorporated in the market data distributed by the CCS. The trading terminal can also execute buy or sell transactions against listed bids and offers, and by using the CCS place the order using the correct protocol for the relevant ECN or electronic exchange.

While the above discussion was in terms of ECNs, it applies here and throughout not only to ECNs but ATSs which generates the equivalent of order books or equivalent information. Equally, while there are a number of electronic exchanges, we will use NASDAQ as an example throughout this document. The term trader and customer are used throughout to designate any potential user of the present invention including traders, brokers and managers.

BRIEF DESCRIPTION OF THE DRAWINGS

FIG. 4 is a representation of a typical market data screen of the present invention showing only NASDAQ Level II data;

FIG. 5 is a representation of a typical market data screen in accordance with the present invention;

DETAILED DESCRIPTION OF THE PREFERRED EMBODIMENTS

Figure 1:
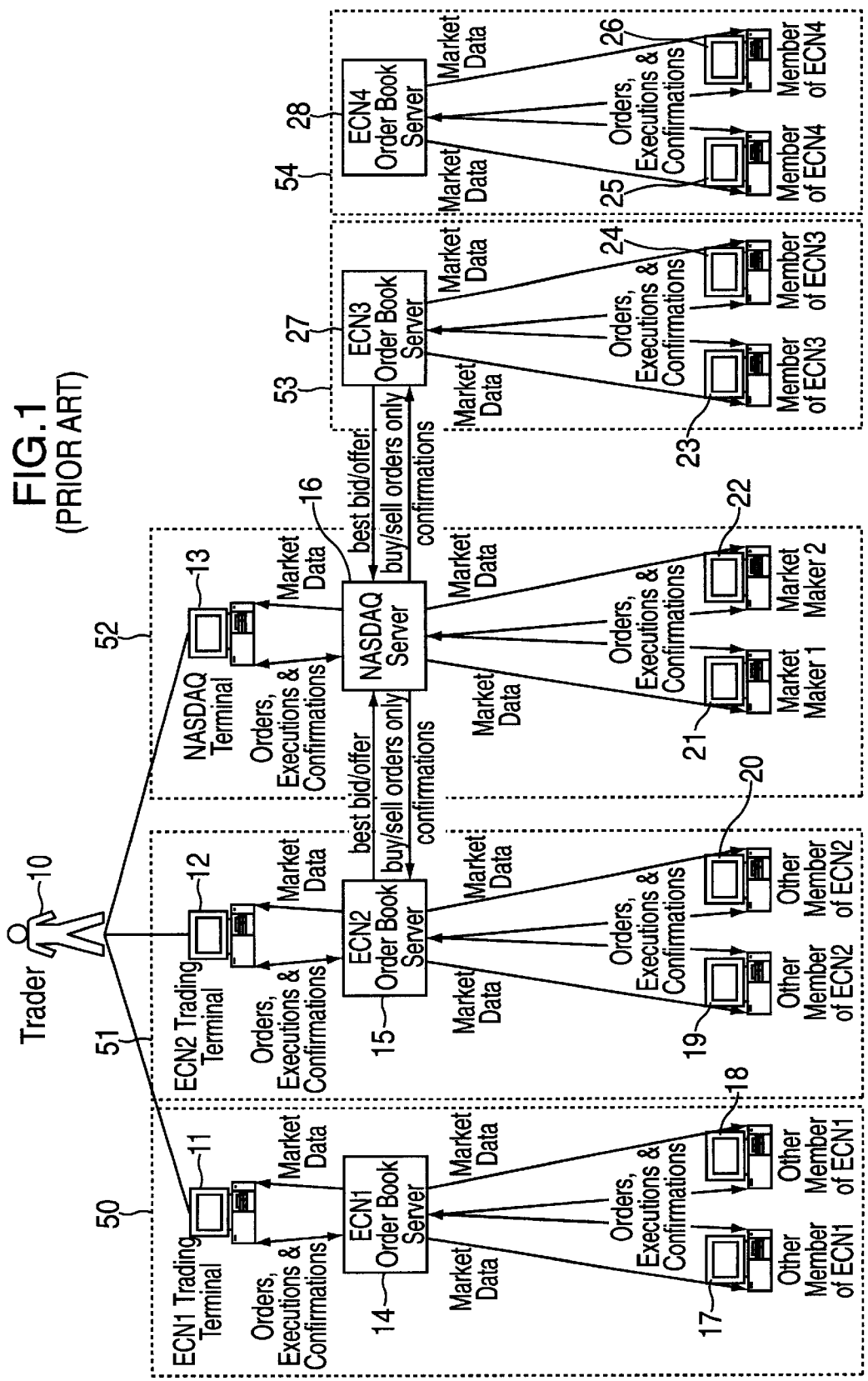
FIG. 1 is a diagrammatic chart of the prior art.

FIG. 1 shows, how before the present invention, trader 10 used several ECNs and NASDAQ to do his/her trading. In the example, trader 10 is a member of two ECNs, ECN1 50 and ECN2 51, and one electronic exchange, NASDAQ 52. Accordingly, for trader 10 to use all three systems, he/she must use three terminals or separate applications on terminal (s) and may have to use up to three protocols in doing so. The trader 10 communicates with ECN1 through trading terminal 11, with ECN2 through trading terminal 12, and with NASDAQ through trading terminal 13. Trading terminals 11 is connected to ECN1's order book server 14, trading terminal2 is connected to ECN2's order book servers 15 and the NASDAQ terminal 13 is connected to the NASDAQ server 16. In turn, ECN1's order book server 14 is connected to the trading terminals of its other members 17 and 18 and ECN2's order book server 15 is connected to its other member's trading terminals 19 and 20.

As noted above, NASDAQ functions differently. NASDAQ has market makers and users. Market makers are responsible for maintaining the market in particular securities. Market makers post their best bid and offer from their proprietary and customer orders for each security in which they make a market to NASDAQ. Market makers accept orders from users and other market makers, and can execute orders with other market makers and ECNs. When executing with a market maker, users may only buy stock at the market makers' displayed offer price and sell stock at the market makers' bid price, i. e., take the offer or hit the bid.

ECN1 50 is a closed network that does not interact with other ECNs or NASDAQ. ECN1's order book server interacts with each of its trading terminals 11, 17 and 18 in the same manner. The ECN1 order book server 14 exchanges orders, executions and conformations with its trading terminals 11, 17& 18 and based on this information supplies market data to each of its trading terminals 11, 17&18. In other words, each of its trading terminals 11, 17& 18 supplies its orders to the ECN1 order book server 14. ECN1's order book server 14 aggregates this information to construct ECN1's order book, which is in turn, supplied to each of its trading terminals 11, 17& 18.

ECN2 51 similarly interacts with its trading terminals 12, 19 and 20. However, ECN2 51 is a SEC conforming ECN that is integrated with NASDAQ. ECN2 51 delivers its best bid and offer for each security traded on it to NASDAQ to be displayed by NASDAQ in combination with the best bid and offer from other conforming ECNs and market makers. ECN2 51 and its members posting its best bid or offer must accept hits from users of NASDAQ 52 corresponding to ECN2 51 posted best bid and offer. Depending on whether it is able to execute those orders (i.e. if the best bid or offer is still available), ECN2-5 1 will send confirmations or rejections to NASDAQ 52. NASDAQ 52 does not receive ECN2's full order book, only the best bid and offer for each security. On the other hand, a conforming ECN that is integrated with NASDAQ 52 does not receive pricing information from NASDAQ 52 and thus can not make NASDAQ market data available to its members. However, an individual member of an ECN may, if entitled as a broker/dealer or otherwise, separately purchase a feed from NASDAQ.

Trader 10 is not a member of ECN3 53 consisting only of order book server 27 and trading terminals 23 and 24. ECN3 53 is a conforming ECN integrated with NASDAQ 52, thus trader 10 will only be able to view information about ECN3 53 on trading terminal 13 and this information will only be the best bid and offer for a security from ECN3 53.

Finally, trader 10 is not a member of ECN4 54 consisting only of order book server 28 and trading terminals 25 and 26. ECN4 54 is not a conforming ECN that is integrated with NASDAQ. Thus the trader 10 does not have access to an ECN4 trading terminal and there can be no interaction between ECN4's trading terminals 25 and 26 and ECN 1, ECN2 or ECN3's trading terminals 17-24.

As can be seen from FIG. 1, in the prior art system, trader 10 must either use separate terminals 11, 12 and 13 or separate applications on one or more terminals to compare share prices and to make his/her bids/offers. The trader 10 may split a large order into bids or offers between two or more terminals or applications. The terminals 11, 12 and 13 may have to use different protocols to access market data, place bids and offers and execute transactions. In some real sense, this destroys the ability to trade in real-time due to the natural delays associated with collecting information from a number of terminals, using a number of different protocols and responding on one or more on such terminals. Such separate systems and terminals not only make it difficult to see pricing data; it makes it difficult to see movements and perform analytics against the data to aid in trading decisions.

Figure 2:
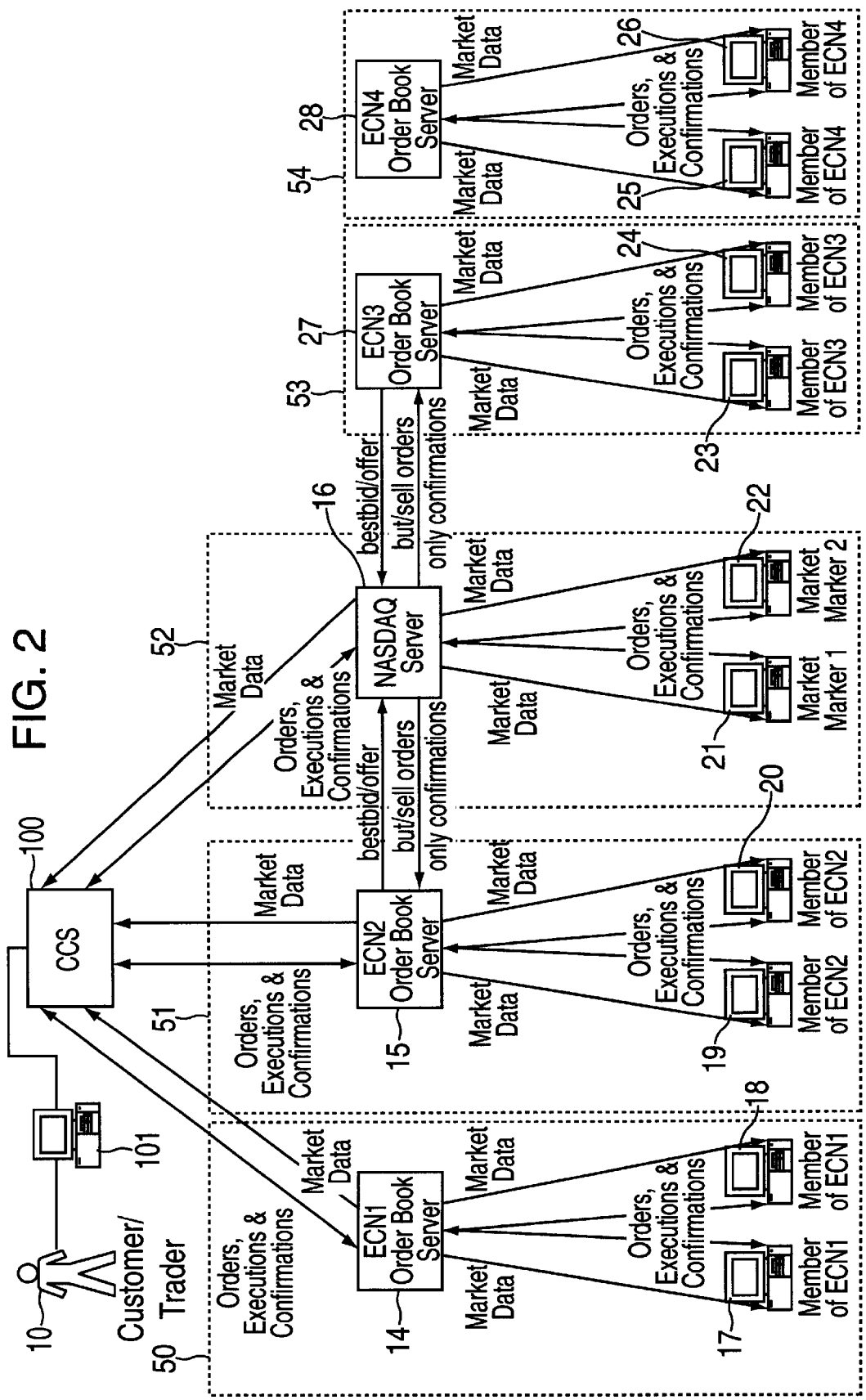
FIG. 2 is a diagrammatic chart of the present invention.

As seen in FIG. 2, the present invention eliminates the need for a separate terminal or application for each ECN and electronic exchange by use of CCS 100. The CCS performs a number of interrelated functions that may be carried out on one computer or a network of computers. In FIG. 2, the inter-relationships between the ECN's and the NASDAQ are the same as that of FIG. 1. However, rather than there being a number of individual terminals 11, 12 and 13 or applications, the CCS 100 collects orders from each ECN, (ECN1 50 and ECN2 51)and electronic exchanges (NASDAQ 52), distributes a composite order book to the customers according to each customer's memberships in the ECNs and rights to use an electronic exchange. Thus customer 10 may only receive a subset of the complete order book compiled by the CCS 100 corresponding to where the customer 10 is permissioned. In this example customer 10 has access to ECN1 50 and ECN2 51 and NASDAQ 52. If, however, customer were only a member of ECN2 51 and NASDAQ, the CCS 100 would not provide order book information from ECN1 50, metric calculations based on information from ECN1 50, or execute any orders to ECN1 50.

The customized order book is displayed on the customer's terminal 101 normally organized by security and price. This allows the customer 10 to compare the information from all of the ECNs 50 and 51 of which it is a member; NASDAQ's market makers 21 and 22; and ECN3 53 best bid an offer in a single display to simplify the decision process. Analytical calculations from this data may also be displayed and used to aid the trader in making buy/sell decisions.

Figure 3:
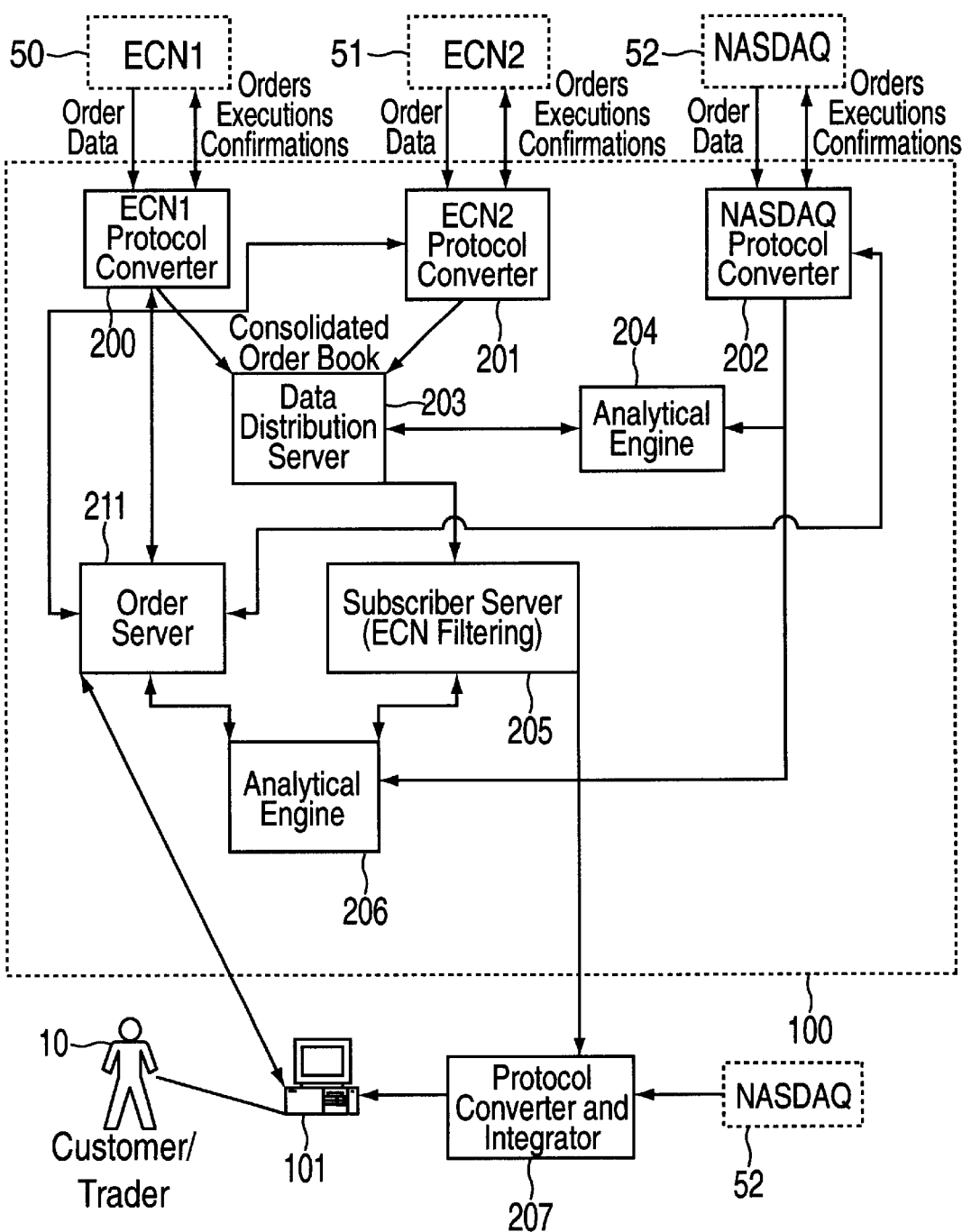
FIG. 3 is a diagrammatic presentation of the CCS.

FIG. 3 is a diagrammatic representation of CCS in accordance with the present invention showing the interrelations of the various functions. The diagram of FIG. 3 corresponds to the system of FIG. 2 with ECN1 50, ECN2 51 and NASDAQ's 52 being directly connected to CCS 100. As in FIG. 2, the customer 10 is a member of ECN1 50, ECN2 51 and a user of NASDAQ 52.

Since the incoming streams of market information consisting of orders, executions and confirmations from participating ECNs and electronic exchanges are to share a common environment in the CCS 100, they must be converted to the same protocol. Accordingly, ECN1 50 and ECN2 51 have their respective protocol converters 200 and 201 which converts them to a common protocol used in the CCS 100 and terminals 17–22 ("system protocol"). Similarly, NASDAQ 52 has a protocol converter 202. Protocol converter 200 to 202 not only convert data for display, but upon an order being placed, convert from the system protocol to the protocol necessary to enter or execute the order on the appropriate ECN or electronic exchange.

The data from ECN1 50, after conversion by the protocol converter 200, is combined with the converted data from ECN2 51 in a data distribution server 203. The data distribution server 203 generates a consolidated order book containing all orders from all ECN members connected to the CCS. This information is organized by distribution server 203 first by security, then by price and then by information such as volume, time or other parameters as desired. The data distribution server 203 forwards to analytic engine 204 information which is available to the public such as trade date, volume data and inside market data to calculate overall market metrics such as historical liquidity and price volatility. Such metrics are distributed to all customers 10 through subscriber server 204 since they do not depend on proprietary data. Time can be saved through a common calculation using such publicly available information to perform calculations common to all customers.

The data distribution server 203 transfers the combined ECN order book information and any relevant analytical data to the subscriber server 205 for ECN filtering, i.e., subscriber server 205 eliminates order and other information to which that customer is not entitled.

The subscriber server 205 supplies the resulting consolidated order book to an analytical engine 206 which, depending on whether the customer 10 is or is not a user or market maker, may also receive converted NASDAQ data from protocol converter 202. The analytical engine 206 reviews the information from the subscriber-filtered order book and provides metrics and analysis for customer 10. The metrics so calculated will be confined to analysis of the data available to the particular customer. Such metrics may include calculations such as price-weighted average volume and historical price spread and density metrics. While the calculations may be based, in part, on NASDAQ information the NASDAQ information is not integrated into the order book so as to not slow down the receipt of NASDAQ information to customer 10.

The calculated metrics are sent by the analytic engine 206 to the subscriber server 205. The subscriber server 205 forwards the customized consolidated ECN order book and customer analytics to trading terminal 101 if the customer 10 is not a NASDAQ market maker or user (not shown). If, however, the customer is a NASDAQ market maker or user, the customer's NASDAQ information feed may also be operatively connected to terminal 101 though a NASDAQ protocol converter and integrator 207. Converter/integrator 207 converts NASDAQ information protocol to systems protocol and integrates the resulting data into the ECN order book information and supplies it to terminal 101 resulting in a consolidated display as seen in FIG. 5 on trading terminal 101. Consolidating the NASDAQ information at this point assures the customer that he/she is always receiving the most current NASDAQ data for display. While the final integration is shown as being performed in NASDAQ protocol converter and integrator 207, converter/integrator 207 may also be converted by terminal 101 itself. Finally, if the terminal 101 is not using system protocol for any reason, the order book information and analytics may be converted to the terminal's protocol by either the terminal itself or by a separate server (not shown).

At trading terminal 101, the customer may filter and/or customize the data displayed based on trading preferences. These features allow the customer to remove orders that are less desirable and view the data in a format optimized for their trading activity. As an example, a customer may specify a minimum quantity for a bid or offer to be displayed. As another example, the customer may customize the display by specifying a minimum price granularity (the smallest allowable increment) for displaying bids or offers (i.e. such as $\frac{1}{32}$ of a dollar), which will cause prices with greater granularity to be rounded as appropriate.

When a customer 10 wishes to place an order, he/she may use trading terminal 101 to send the order to the order server 211 which may use information from the analytical engine 206 to determine when and where to place the order, based on parameters indicated by the customer. For example, the order server 211, using information from analytical engine 206, could break up a single order, routing it to more than one ECN and/or electronic exchange.

FIG. 4 depicts a typical market data screen 250 of the present invention. Such screens can be customized as to data or order to conform to the customer's trading style. Here the customer 10 has elected to receive only NASDAQ 52 data by failing to check ECN election box 251. Thus, screen 250 only displays NASDAQ level I & II information. The security under review is Dell Computer Corp. It was elected by inserting its ticker symbol DELL in space 252. NASDAQ Level I information 253 is displayed at the top of screen 250, including the last trade price 254, an arrow indicating the current movement of the highest bid 255, the net change 256 of the last trade price with respect to yesterday's closing price, the volume of the last trade 257, the high 258 and low 259 trade prices for the day, and the total volume traded for the day 260. Each screen also contains bid 261 and offer data 262. The bids 261 are sorted in descending order by price, and the offers 262 are sorted in ascending order by price. For each quote, the following information is displayed: volume in 100's of shares 265, the four-character identification of the market maker or ECN 266, and the price 267. A * character is used to show the most recently updated quote.

The grayed entries indicate the highest bid 270, 271 and 272 of three ECNs Island (ISLD), Instinet (INCA) and Strike (STRK) and the lowest offer 273, 274 and 275 of Instinet, Island and Strike. Thus, the latest offer for Dell was made by the market maker SHWD, that is Sherwood Securities, which offered to sell 1000 shares at $39^{7}/_{16}$. Screen 250 shows no more than pricing information currently available from NASDAQ Level II service.

FIG. 5 shows pricing data that would be available to a customer of the present invention. Here, space 251 has been checked on screen 280 and ECN information integrated into the display. Screen 280 shows not only NASDAQ Level II data but also the full order book for the following three ECNs: Instinet, Island and Strike. For these ECN's, there are multiple bids and offers available for DELL, as opposed to just the best bid and offer. For example, Island has outstanding five bids 281–285 in addition to its high bid 207, and three offers 286–288 in addition to its low offer 274, all at varying prices and quantities. Screen 280, thus, offers access to a greater amount of pricing information (thus greater liquidity), consolidated in one display. Thus, the entire order books of all ECN members and the market makers' bids and offers are consolidated into a single informative screen for any particular security. This additionally provides the customer with the ability to take advantage of price variations in a rapidly changing environment.

Figure 6:
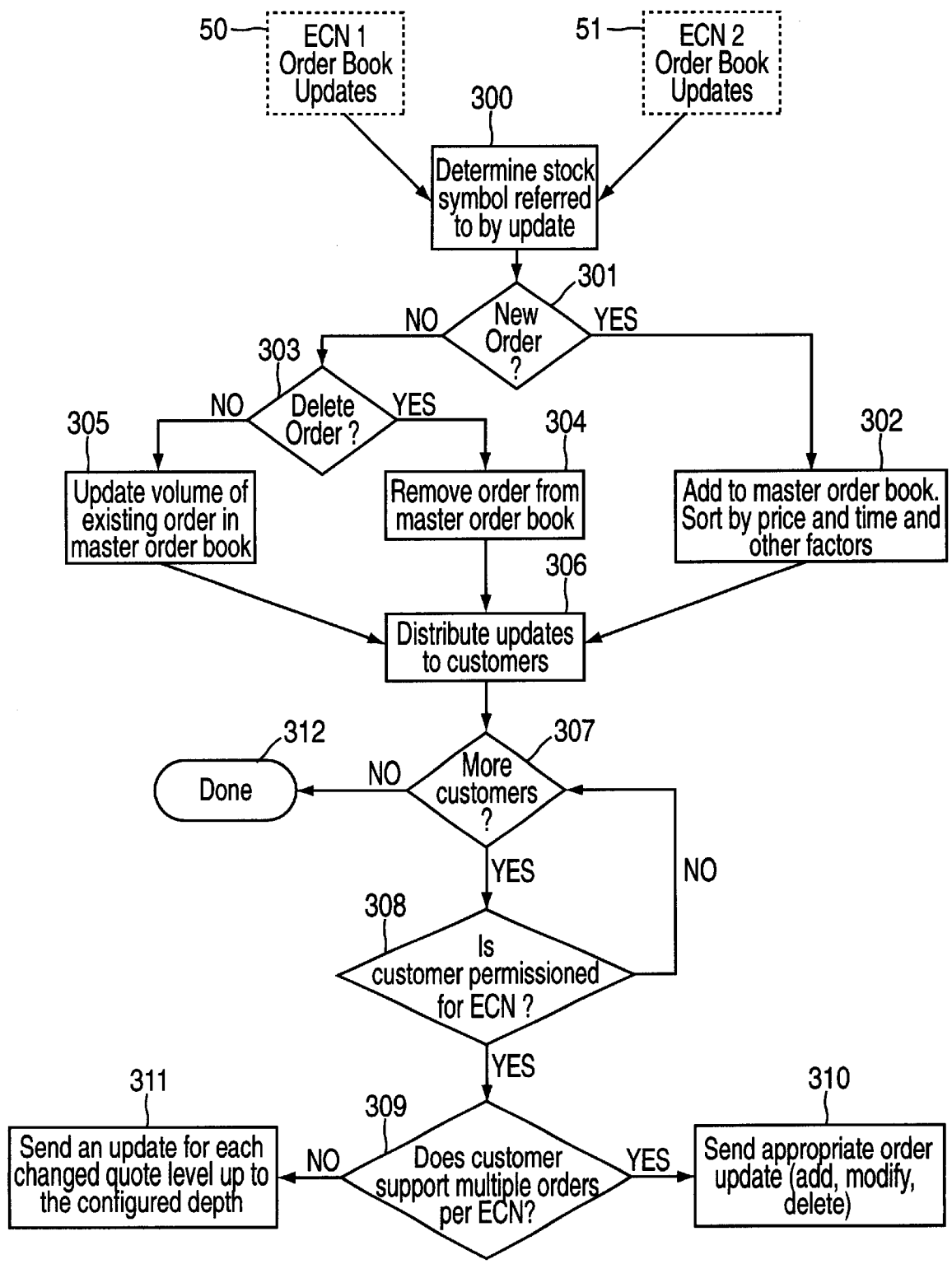
FIG. 6 is a flow diagram showing the integrating and updating of data to form the consolidated CCS order book.

FIG. 6 is a flow diagram showing how the consolidated order book is formed from the order books of each ECN on the system. ECN1 and ECN2 internally update their order books as orders are placed by their respective members. Simultaneously, the updated information is forwarded to the CCS 100 where the CCS 100 determines, for each update, what security is being updated by reviewing the ECN's stock symbol for the transaction 300. Once the security is determined, the CCS 100 decides whether the update is a new order or a change in an existing order 301.

If it is a new order, the CCS 100 adds to the master order book the new order and then sorts the order book by price and other factors for a given security 302 . If it is not a new order, the computer then determines whether it is a delete order 303. If it is a delete order, the computer removes the order from the master order book 304. If it is not a delete order, it updates the volume of the existing order in the master order book 305. Before the CCS 100 can distribute the updates to its customers 306, the CCS must determine which customers should receive the update, i.e., it determines whether the customer is a member of the ECN or a user of the electronic exchange supplying the information 308.

Next, it determines whether the customer is configured to receive multiple orders per ECN in its terminal 309. A customer that normally receives data from exchanges like NASDAQ expects only a single bid or offer for a given quote source, such as a market maker or ECN. This type of customer may not be able to handle multiple bids and offers for a given ECN within its existing systems. If the customer can take multiple orders from a single source, the CCS 100 sends an appropriate order update 310. If not, the CCS 100 will take the sorted bids and offers of the ECN and convert them to individual quotes 311, each with their own unique identification based on the ECN's identification, such as ECN1-1, ECN1-2. In either case, the subscriber server 205 forwards the customized order book to each customer along with the relevant analytical data 310. The customer 10 has a direct feed from NASDAQ 52 and it is integrated with the ECNs order book by the terminal 101 as explained in the discussion of FIG. 3.

Figure 8:
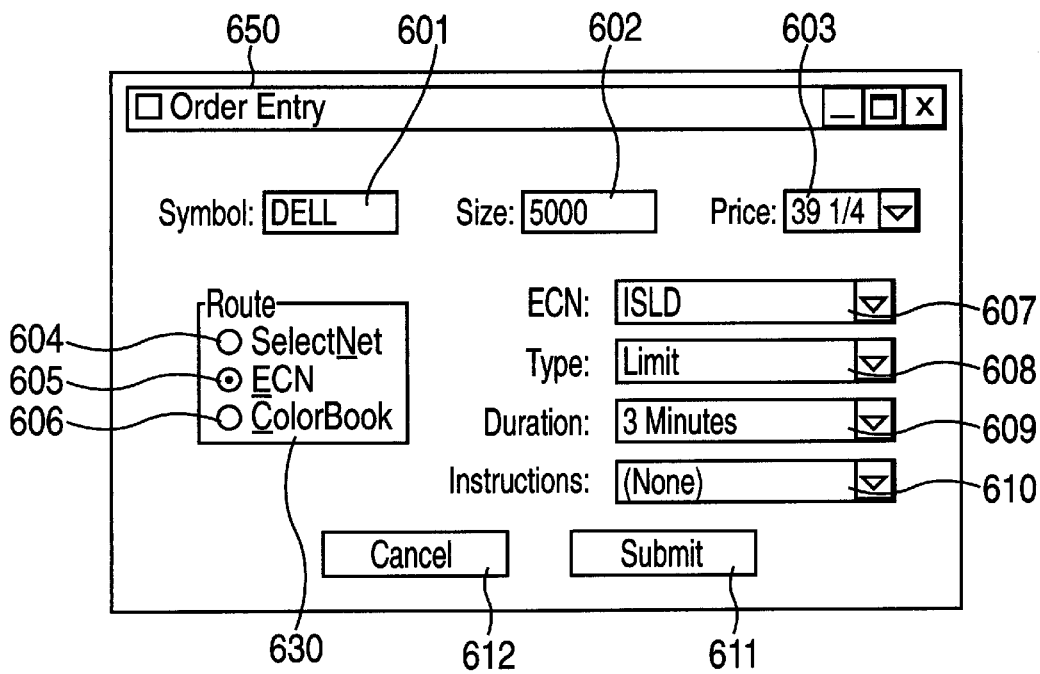
FIG. 8 is a representation of a typical buy order entry screen of the present invention.
Figure 9:
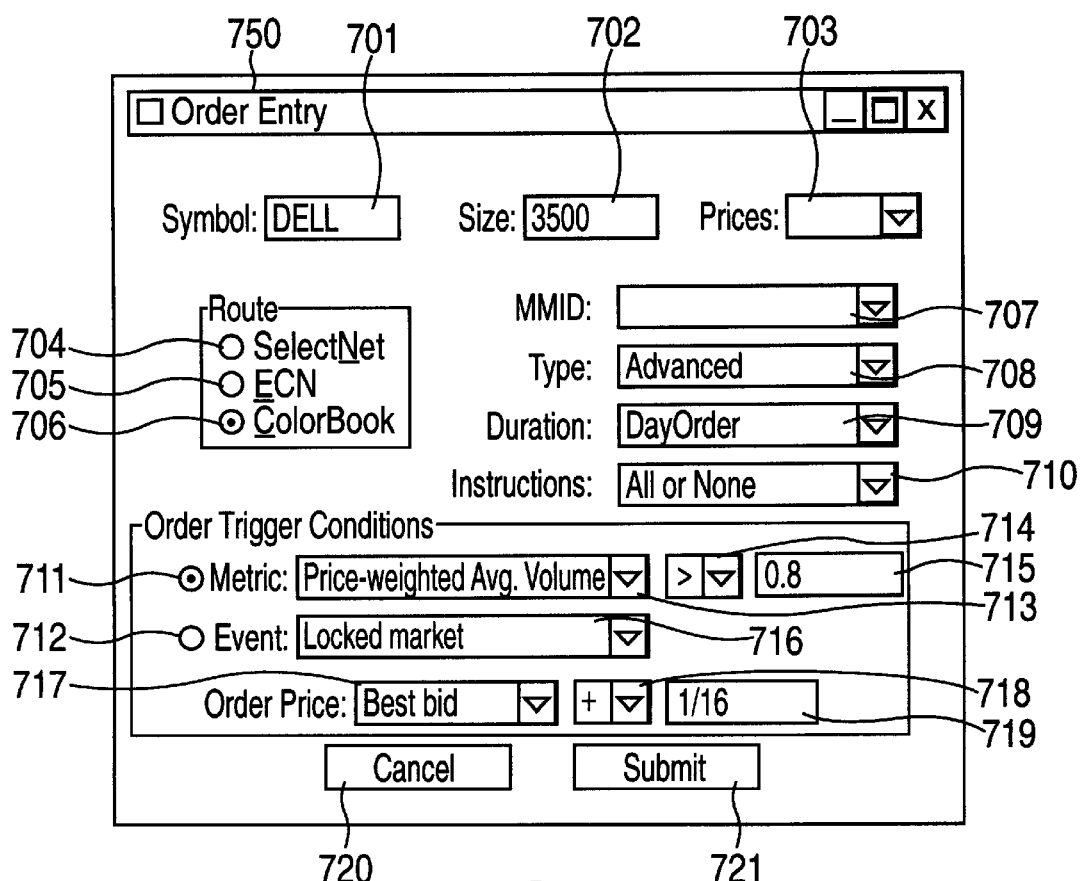
FIG. 9 is a representation of a typical sell order entry screen of the present invention.

The customer 10 can enter orders on a buy order entry screen 650 as seen in FIG. 8 or a sell order entry screen 750 as seen in FIG. 9. As seen in FIG. 8, the buy order entry screen 650 has a space 601 to allow entry of a stock or other symbol for selection of the security to be bought. In FIG. 8, DELL, the stock symbol for Dell Computer Corp., is displayed in space 601. The customer also specifies the number of shares it wishes to purchase at space 602 and the price at which he/she wishes to purchase at 603. If no price is indicated, this is a market order, that is the user is willing to buy the security at the best available price.

The customer 10 can then select routing information as to where the order should be placed by selection of the route 630. Only one route may be selected. If the purchase is to be made from NASDAQ, the customer clicks on the entry space 604 for NASDAQ's SelectNet network. Whereupon space 607 changes the label shown in FIG. 8 from "ECN" to "MMID" which stands for market maker identification. The drop-down list at space 607 contains the market makers or ECN's to which this order can be directed. The customer 10 then selects the market maker he/she wishes to preference, i. e., which market makers offer he will accept. If no market maker is selected, then the order is broadcast to all market makers.

If the purchase is to be from a particular an ECN, the customer clicks at entry space 605. If the customer 10 wishes to place a bid or take offer from a particular ECN, he/she selects a particular ECN from the drop down list 607. Drop down list 607 will only display the ECNs which the customer is a member.

If from the entire CCS order book is selected by clicking at entry space 606 which is indicated by the trademark ColorBook™ for the system of the present invention, then the CCS 100 will determine the best actual route for the order, including breaking the order up into multiple suborders which are routed separately.

The type of transaction is selected at space 608. Standard types of orders are market and limit orders. A market order is an order to buy at the best price available. A limit order indicates that the entered price is the maximum price that the user is willing to pay. A market order will normally take the current best offer, whereas a limit order will usually have a price lower than the current best offer, and will cause a bid to be posted. If the customer 10 wishes to select a certain metric or event trigger condition supplied by the analytic engines 204 and 206 to determine when and how the buy order should be placed, he/she routes the order through the complete order book (selects space 606) and selects "Advanced" as the type from the drop down list 608. Additional option such as shown in FIG. 9 for sell orders are then displayed. The discussion of these features with regard to FIG. 8 are also applicable here. Additional types of orders may be available, and if so, will be displayed at drop down list 608, such as hidden limits.

The customer 10 may also set the duration that the order will remain open at drop down list 609. It will only come into play if the order does not result in an execution. The durations available will depend on the route chosen for the order, and can be a fixed amount of time, or be "good until canceled."

Finally, the customer 10 may give certain special instructions as listed in the instruction drop-down list 610, such as "all ornone", "block size", or "minimum quantity." The instructions available will depend on the route chosen for the order.

The customer 10 can submit 611 or cancel the transaction 612.

FIG. 9 depicts the sell order entry screen 750. In this case, the user is interested in selling securities, and can either post an offer or hit an existing bid. The fields available on this screen are the same as those available in the buy entry order screen 650. The stock symbol of the security to be sold is entered at space 701, the amount of the securities to be sold is entered at space 702, the limit price, if any, at space 703. The route is selected at 704, 705 and 706 as in the buy order entry 604, 605 and 606. As is the case with drop down list 607, drop down list 707 will display lists for either ECN selection or a market maker selection depending on the route selected by the customer 10.

The type of order is selected at drop list 708 similar to the drop list 608. Standard order types are "market order", "limit order" or "hidden limit order." As with bids, other types of orders are possible, and the CCS will expose the appropriate order types on the drop down list 708 based on the route selected. As with the screen of FIG. 7, if the customer 10 wishes to use metrics or events to determine how and when to sell, he/she selects the full order book route at space 706 and advanced from the drop down list 708. In this case, the user has the option of specifying an order that will only be entered based on a triggering condition.

The triggering condition can either be a metric calculation selected by space 711 or the occurrence of an event selected by space 712. Metric triggering conditions can be instructions that the order be placed when a specified expression involving a real-time data metric is true. The customer can select the metric value from drop down list 713, the operator from drop down list 714, and the trigger value in space 715. If the metric option is selected, the event dialog 712 and 716 will be greyed.

The triggering condition can be an event upon the occurrence of which the order is placed. In such case, the customer chooses the event from drop down list 716. Triggering event can be events such as "locked market", "new high" or "new low". Other triggers can be programmed. The user can specify the price to use for entering the order when the triggering condition occurs at spaces 717–719. An absolute price can be specified, or the price can be specified based on the best bid or best offer at the time. In FIG. 9, the best bid price has been selected as the order price on the occurrence of the triggering event from the drop list 717. Similarly, the margin above or below the best bid price can be set at drop list 718 and the amount over or below the best price is entered space 719.

The duration of the offer to sell is set at 709 and the customer can add instructions at 710 such as "all or none", "block size," or "minimum quantity." For example, FIG. 9 shows that all or none of the shares are to be sold. Upon filling out all relevant information, the customer 10 can then cancel or submit the transaction at 720 and 721, respectively.

Figure 7:
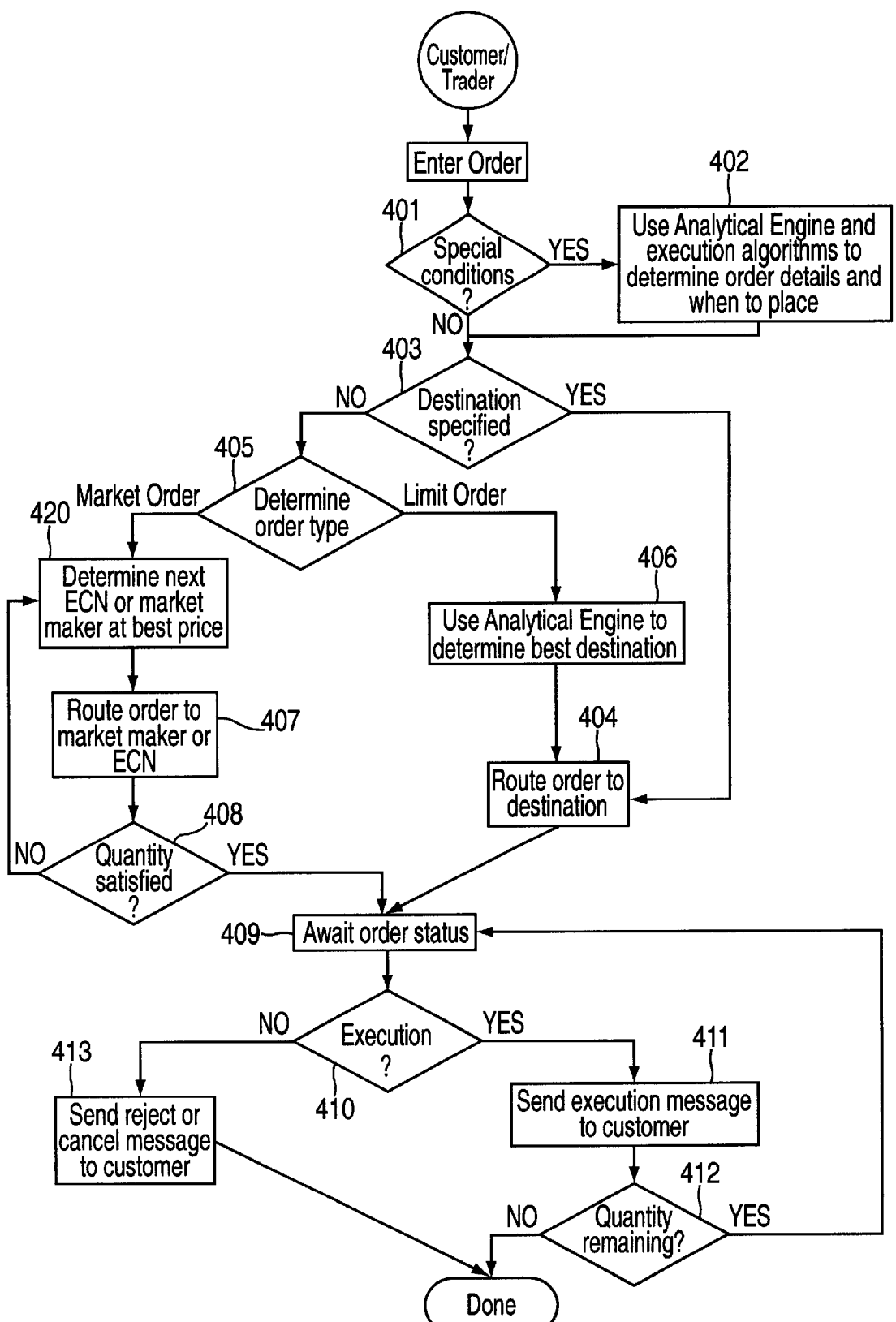
FIG. 7 is a flow diagram showing execution of a transaction for the present invention.

FIG. 7 is a flow diagram of the process for placing orders through the CCS 100. Once the order has been entered through either the dialog box of FIGS. 8 or 9, the CCS 100 determines if there are any special conditions as set from the advanced portion of the dialog box 711 through 719 or the equivalent for the buy order entry 401. If there are special conditions, the order server uses the analytical engine to determine where and when to place the order based on these conditions 402.

If there are no special conditions or the analytical engine has determined the order details and it is time to so place the order, the CCS 100 determines where the order should be routed 403. If it is destination specified, the order is directly routed to its selected destination 404.

If there is no destination specified, then the CCS determines whether it is a market order or a limit order 405. If it is a limit order, analytic engine 206 is used to determine the best destination, taking into account only those ECNs and electronic exchanges of which customer 10 is a member 406. The CCS 100 then routes the order to the appropriate destination 404.

If it is a market order, that is an order to buy or sell at market prices, then the CCS 100 determines the market maker or ECN at the best price 420 and routes the order to the market maker or ECN member 407. If this does not fully satisfy the quantity of the customer's order 408, the next ECN or market maker at the best price is selected. This process continues until the entire order has been satisfied. After an order has been sent to its destination, the CCS awaits for return order status message from the destination 409. Upon receipt of a response from the destination, it determines whether the order was executed or not 410. If executed, it sends an execution message 411 to the customer 10 and determines if there is any quantity remaining in the order which must be satisfied 412. If there are other orders remaining from a split order, the CCS again awaits the order status for the remaining orders placed 409. If the execution was denied, in whole or in part, because the stock had already been sold or the bid or offer withdrawn, the CCS sends a rejection or cancel message 413 to customer 10. If, however, it is a market order, the order may be re-routed to 420 for further selection to determine the next ECN or market makers at the best price. After all the orders are executed or canceled, the CCS is finished with the order.

It is understood that the present embodiment described above is to be considered as illustrative and not restrictive. It will be obvious to those skilled in the art to make various changes, alterations and modifications to the invention described herein. To the extent that these variations, modifications and alterations depart from the scope and spirit of the appended claims, they are intended to be encompassed therein.

We claim:

1. A financial data processing system for securities or commodities for traders which integrates order book information from two or more alternative trading systems comprising:

at least two alternative trading systems having different order book information protocols;

data communication means to receive information from each participating alternative trading system to allow receipt of their order book information in their native order book information protocols;

converter means to convert order book information of each alternative trading system into a common system order book information protocol;

integration means for combining the order book information from each alternative trading system data communications means into a single order book;

means for distributing the resulting combined order book to traders in the common order book information protocol; and display means for displaying said order book to traders.

2. The financial data processing system of claim 1 wherein there are means to limit the order book information supplied to any individual trader to order book information from only those alternative trading systems of which the trader is a member.

3. The financial data processing system in accordance with claim 1 wherein at least one electronic exchange, having its native order information protocol, participates in said financial data processing system of the present invention and wherein the participating electronic exchanges' order book information is integrated with the order book information of the alternative trading systems including:

data communications means to receive information from each participating electronic exchange to allow receipt of its order book information in the electronic exchanges' native order book information protocol;

converter means for converting the order information from said participating electronic exchange into the common system order book information protocol; and integration means to integrate the order book information from the alternative trading system with the order book information from one or more electronic exchanges to make a combined order book.

4. The financial data processing system of claim 3 having means for converting back and forth between the individual alternative trading systems' and electronic exchanges' order placement protocol and a common system order placement protocol thereby allowing traders to place orders, hit bids, take offers and receive confirmation of executions, in any of the individual alternative trading systems or the electronic exchanges.

5. The financial data processing system of claim 4 wherein the converting means which converts between the individual alternative trading systems and exchanges and the common system order placement protocol allows traders to place orders, hit bids, take offers and receive confirmation of execution, takes advantage of all the special order entry features of each participating alternate trading system and electronic exchange.

6. The financial data processing system of claim 3 where there are means for filtering out order book information by parameters selected by the trader.

7. The financial data processing system of claim 1 having means for converting back and forth between the individual alternative trading systems' order placement protocol and a common system order placement protocol thereby allowing traders to place orders, hit bids, take offers and receive confirmation of executions.

8. The financial data processing system of claim 1 wherein there is sorting means which organizes the order book information by security, by bid or sale and then by price, volume or other variables as selected by the trader.

9. A data processing method for providing trading information to traders in a security or commodity from two or more alternative trading systems, comprising the steps of:

receiving order book information from each participating alternative trading system in order book information protocols native to the particular alternative trading system;

converting the information to a common system order book protocol;

integrating the order book information from each alternative trading system into a single order book;

distributing the combined order book to the traders in the common system order book protocol; and displaying said combined order book to the traders.

10. The method of claim 9 wherein order book information to any trader is limited to only those alternative trading systems which the trader is a member.

11. The method of claim 9 wherein the order book of the alternative trading systems is integrated with information from one or more electronic exchanges.

12. The method of claim 11 wherein the information received from an alternative trading system and the electronic exchanges are analyzed and the analysis information is used to aid traders in placing of bids and offers.

13. The method of claim 12 wherein the analysis information is supplied to the trader to aid in placing orders.

14. The method of claim 13 wherein the analysis information automatically controls the placing of orders.

15. The method of claim 13 wherein the trader places orders, hits bids, takes offers and receives confirmation of execution in a common order placement protocol.

16. The method of claim 15, wherein all the special order entry features of each participating alternative trading system is maintained in the common system order placement protocol.

17. The method of claim 11 where the order book information is filtered by parameters selected by the trader.

18. The method of claim 11 where the information is integrated by securities, bids and offers and then sorted by price.

19. The method of claim 9 wherein order book information is also supplied from one or more electronic exchanges in their native order information protocol which is converted to the common book protocol and integrated into the combined order book information.

* * * * *